US009803823B2

(12) United States Patent
Tessnow et al.

(10) Patent No.: US 9,803,823 B2
(45) Date of Patent: Oct. 31, 2017

(54) VEHICLE LED BULB WITH POLYGONAL LIGHT GUIDE

(71) Applicants: Thomas Tessnow, Weare, NH (US); Ronald E. Boyd, Jr., Chichester, NH (US); Catherine Cullity, Concord, NH (US)

(72) Inventors: Thomas Tessnow, Weare, NH (US); Ronald E. Boyd, Jr., Chichester, NH (US); Catherine Cullity, Concord, NH (US)

(73) Assignee: Osram Sylvania Inc., Wilmington, MA (US)

( * ) Notice: Subject to any disclaimer, the term of this patent is extended or adjusted under 35 U.S.C. 154(b) by 148 days.

(21) Appl. No.: 14/607,700

(22) Filed: Jan. 28, 2015

(65) Prior Publication Data
US 2016/0215949 A1    Jul. 28, 2016

(51) Int. Cl.
F21S 8/10    (2006.01)
F21V 8/00    (2006.01)

(52) U.S. Cl.
CPC ........... *F21S 48/225* (2013.01); *F21S 48/215* (2013.01); *F21S 48/2262* (2013.01); *F21S 48/2281* (2013.01); *F21S 48/328* (2013.01); *F21S 48/33* (2013.01); *G02B 6/0096* (2013.01); *F21S 48/212* (2013.01)

(58) Field of Classification Search
CPC .... F21S 48/115; F21S 48/1241; F21S 48/215; F21S 48/225; F21S 48/2225; F21S 48/2231; F21S 48/2237; F21S 48/328; F21W 2101/00; F21W 2101/10; F21W 2101/12; F21W 2101/14; G02B 6/0096
See application file for complete search history.

(56) References Cited

U.S. PATENT DOCUMENTS

| 2,362,131 | A | * | 11/1944 | Haggart, Jr. | ............. G08G 1/09 340/321 |
| 4,350,150 | A | * | 9/1982 | Kubota | ..................... A61B 1/07 600/176 |
| 6,160,948 | A | | 12/2000 | McGaffigan | |
| 6,895,164 | B2 | | 5/2005 | Saccomanno | |
| 7,059,748 | B2 | | 6/2006 | Coushaine et al. | |
| 7,110,656 | B2 | | 9/2006 | Coushaine et al. | |
| 7,275,849 | B2 | | 10/2007 | Chinniah et al. | |
| D586,751 | S | | 2/2009 | Coushaine et al. | |
| D610,544 | S | | 2/2010 | Coushaine et al. | |
| 7,731,402 | B2 | | 6/2010 | Tessnow et al. | |
| 7,828,472 | B2 | * | 11/2010 | Liu | ......................... G02B 6/001 362/551 |
| 8,474,994 | B2 | * | 7/2013 | Campman | ................ F21L 4/02 362/102 |

(Continued)

FOREIGN PATENT DOCUMENTS

WO    2011147877 A1    12/2011

*Primary Examiner* — Alan Cariaso
(74) *Attorney, Agent, or Firm* — Edward Podszus (57) ABSTRACT

An automotive LED lamp having a light guide (28) having a single central bore (29) defined by a cylindrical wall (26) and an outer surface (31) defined by a plurality of outer wall segments (35) bounding, as seen in cross-section transverse the optical axis (18) a regular polygonal shape having more than four sides. The outer polygonal shape has between five sides and sixteen sides, preferably a ten-sided decagon.

27 Claims, 6 Drawing Sheets

(56) References Cited

U.S. PATENT DOCUMENTS

| | | | |
|---|---|---|---|
| 8,789,992 B2* | 7/2014 | Lee | G02B 5/045 362/551 |
| 2007/0019398 A1* | 1/2007 | Chen | B60Q 7/00 362/102 |
| 2008/0291664 A1* | 11/2008 | Pesenti | E01F 9/20 362/153.1 |
| 2009/0129230 A1 | 5/2009 | Grotsch | |
| 2009/0185389 A1 | 7/2009 | Tessnow et al. | |
| 2010/0207505 A1 | 8/2010 | Tessnow | |
| 2011/0309735 A1* | 12/2011 | Parker | F21V 3/02 313/46 |
| 2014/0085897 A1* | 3/2014 | Hakam | H05B 37/0236 362/253 |
| 2015/0212263 A1* | 7/2015 | Tzeng | F21V 17/12 362/555 |
| 2015/0252977 A1* | 9/2015 | Jungwirth | F21V 7/0091 362/551 |
| 2016/0018064 A1* | 1/2016 | Jurik | F21S 8/00 362/231 |
| 2016/0062027 A1* | 3/2016 | Jungwirth | F21V 7/06 362/607 |

* cited by examiner

VEHICLE LED BULB WITH POLYGONAL LIGHT GUIDE

CROSS REFERENCE TO RELATED APPLICATIONS

N/A

TECHNICAL FIELD

The present disclosure relates to light sources employing light emitting diodes (LED or LEDs) and more particularly to light sources useful in the automotive field such as for taillights, stoplights, fog lights and turn signals. More particularly, it relates to such light sources employing a light guide made of light transmissive material.

BACKGROUND

The following vehicle lamps are known: U.S. Pat. No. 7,110,656 (Coushaine and Tessnow); U.S. Pat. No. 7,731,402 (Tessnow); U.S. Pat. No. 7,059,748 (Coushaine); U.S. Des. 610,544; and Pat. Pubs. US2010/0207505 (Tessnow) and US2009/0185389 (Tessnow). The following light guides are known: U.S. Pat. No. 7,275,849 (Chinniah); U.S. Pat. No. 6,895,164 (Saccomanno); U.S. Pat. No. 6,160,948 (McGaffigan); and PCT Int. Appln. WO 2011/147877 (Eichelberger).

Figure 3:
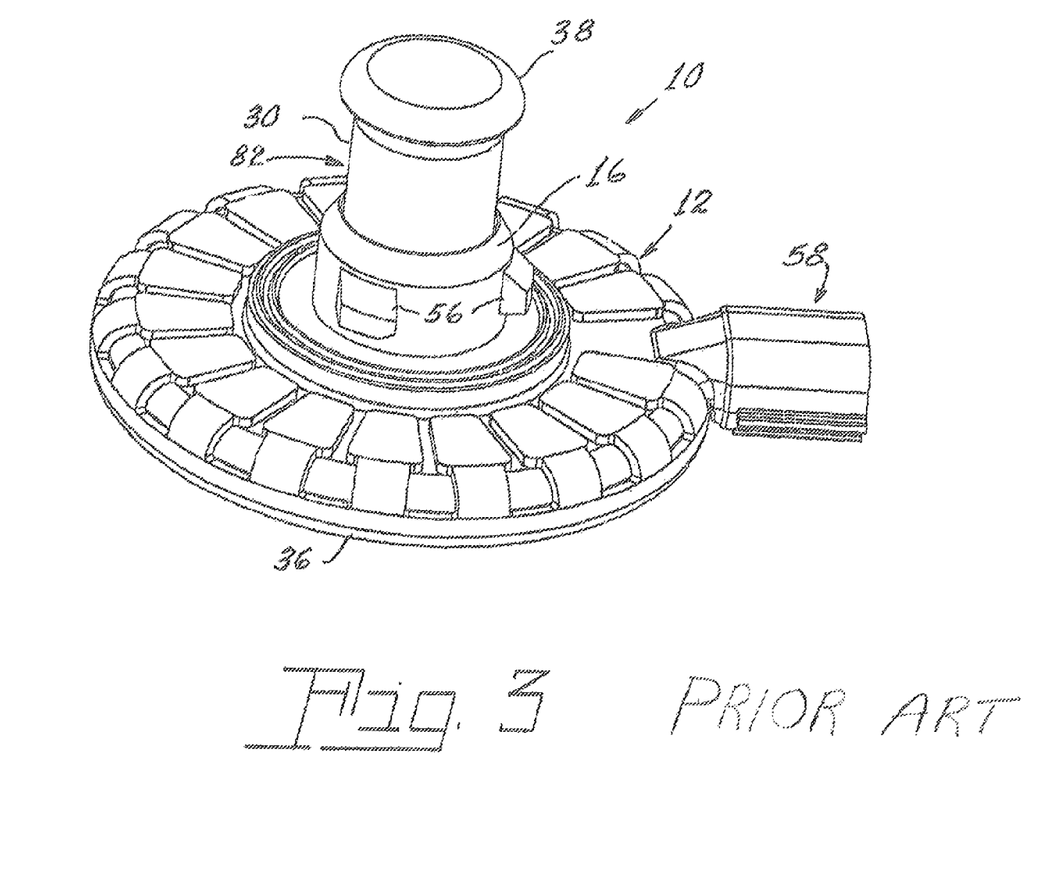
FIG. 3 is a perspective view of a prior art light guide and lamp according to U.S. Pat. No. 7,110,656.

Vehicle lamps similar to those depicted in U.S. Pat. No. 7,110,656 or U.S. Des. 610,544 have been manufactured and marketed by Osram Sylvania Inc. in the United States under the trade designation L1224R lamp, which has a hollow light guide that, transverse along its major longitudinal extent, is tubular in cross-section having both inner and outer smooth cylindrical walls, and with four (4) LEDs (reference numeral 24) spaced equidistant in a circular pattern in register with the wall thickness "T", as shown in FIG. 2 of the aforementioned U.S. Pat. No. '656. Over a majority of its length the cylindrical light guide has an inner cavity with an inside diameter of about 10 mm, an outer diameter of 16.5 mm, and thus a wall thickness of about 3.25 mm.

BRIEF DESCRIPTION OF THE DRAWINGS

Reference should be made to the following detailed description, read in conjunction with the following figures, wherein like numerals represent like parts.

For a thorough understanding of the present disclosure, reference is made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient. Also, it should be understood that the phraseology and terminology used herein is for the purpose of description and should not be regarded as limiting.

DETAILED DESCRIPTION INCLUDING BEST MODE OF A PREFERRED EMBODIMENT

Figure 4A:
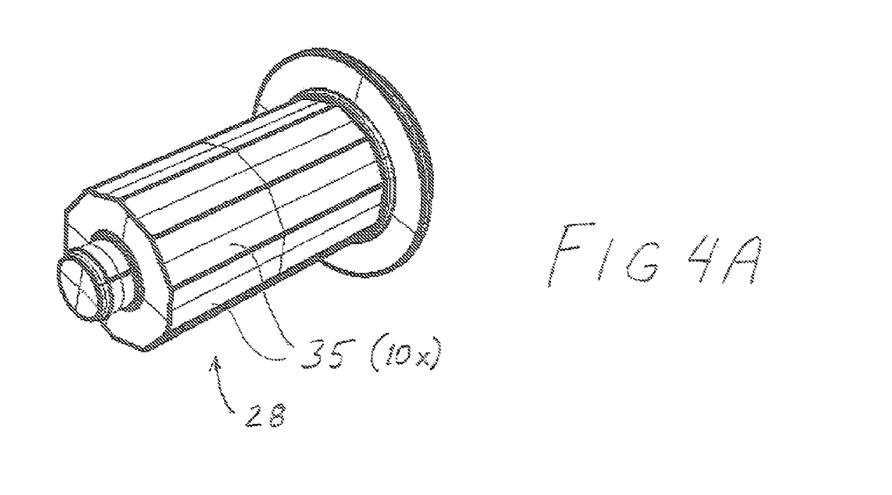
FIG. 4A is a perspective view of an embodiment of a light guide employable with the present disclosure.
Figure 4B:
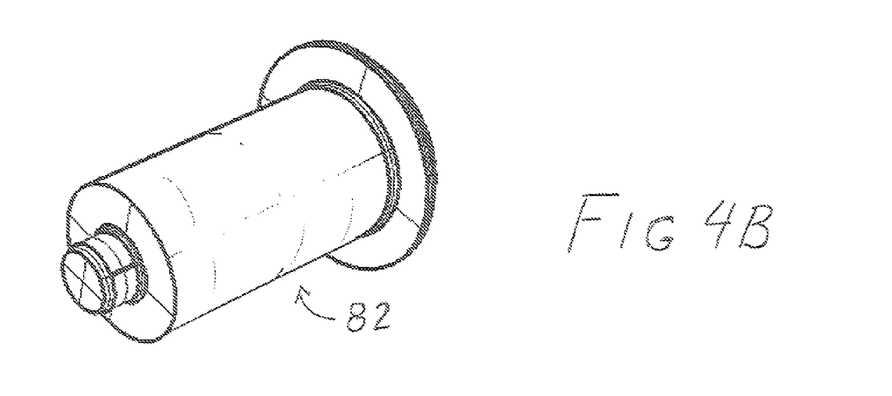
FIG. 4B is a perspective view of a prior art light guide employed with the LED lamp according to U.S. Pat. No. 7,110,656.

FIG. 3 and FIG. 4B show a prior art LED lamp having light guide 82 indicated thereon that is built according to U.S. Pat. No. 7,110,656 and marketed in the US by Osram Sylvania Inc. under, for example, the trade designation L1224-R. The reference numerals on FIG. 3 indicate parts as described in the U.S. Pat. No. '656. The prior art light guide 82 receives light from four (4) LEDs spaced equidistant on an imaginary circle. Light from the LEDs is guided and mixed within the light guide and then redirected by the reflector ring 38 to fill another reflector optic (mounted on the chassis) that forms the tail lamp beam. Light guide 82 is, over a majority of its length, cylindrical with an inner cylindrical cavity having an inside diameter of about 10 mm, an outer diameter of 16.5 mm, and thus a wall thickness of about 3.25 mm. Applicants herein recognized that some light does not hit the reflector ring 38 and exits directly from the light guide. In certain directions there are peaks visible, one peak (or set of peaks) corresponding to each LED, for example four peaks visible, which are significantly higher than the intensity at surrounding exit angles. These four peaks exceed the relevant maximum specification for the bulb type LR1 in the harmonized United Nations Economic Commission for Europe ("ECE") regulation No. 128. The ECE regulation 128 ("ECE R128") contains uniform provisions concerning the approval of light emitting diode (LED) light sources for lamp units on motor vehicles. Regulations concerning LED light source category LR1 are contained in Annex 1 to UN Regulation No. 128 (available from UN ECE, Palais des Nations, CH-1211, Geneva 10, Switzerland).

Figure 6:
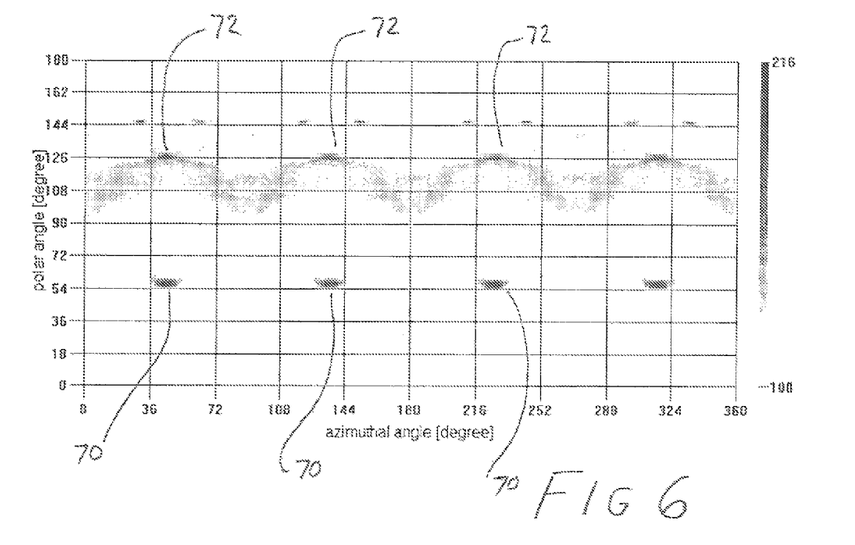
FIG. 6 illustrates an emission pattern of an LED lamp having the prior art light guide in a Mercator plot.
Figure 7:
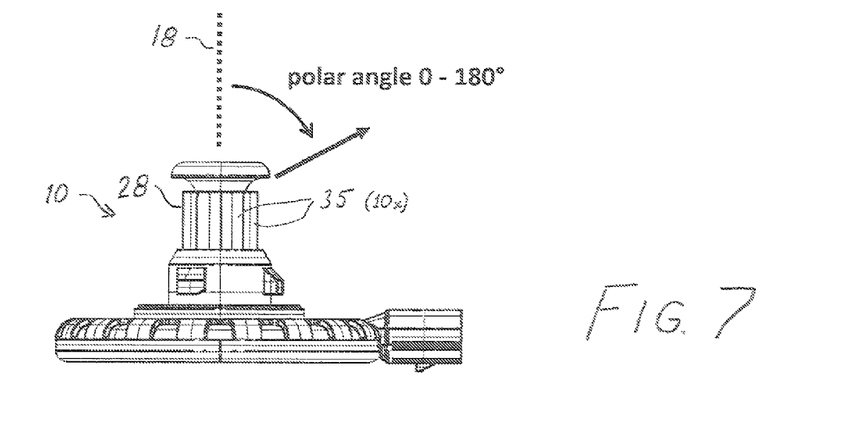
FIG. 7 illustrates a direction in which a polar angle is measured.

FIG. 6 shows a plot of an emission pattern as a Mercator plot of a prior art lamp and light guide of FIG. 3 illustrating the peaks that exceed, or nearly exceed, the ECE R128. The graphic in FIG. 7 shows the orientation of the polar angle referenced to optical axis 18 as depicted on the improved lamp 10 of the present application which has a 10-sided light guide 28, reference hereto for explanatory purposes relative to FIG. 6 and prior art FIG. 3 merely to illustrate the orientation of the direction indicated as "polar angle" declining from the optical axis and thus having a range of 0 to 180 degrees and the direction indicated as "azimuthal angle" as being in a plane perpendicular to the plane in which the polar angle is indicated and sweeping one revolution around optical axis 18, the azimuthal angle thus having a range from 0 to 360 degrees. With reference to FIG. 6, the present Applicants determined, such as through computer simulation, that the prior art lamp and light guide arrangement exhibits a primary peak 70 at circa 55 degrees polar angle that has an intensity, as measured in cd/klm (candela/kilolumens), in excess of 115 cd/klm maximum allowed in ECE R128. Applicants also determined a secondary peak 72 at circa 126 degrees polar angle that tends to exceed the 200 cd/klm maximum allowed at that location in ECE R128.

Applicants herein determined through simulation that the peaks are due to an unfortunate superposition of reflected images inside light guide 82. The peaks 70 (or sets of peaks 70, 72) are 90 degrees apart (azimuthal angle) because there are four LEDs spaced equidistantly around an imaginary circle at the light entrance to light guide 82.

Figure 5:
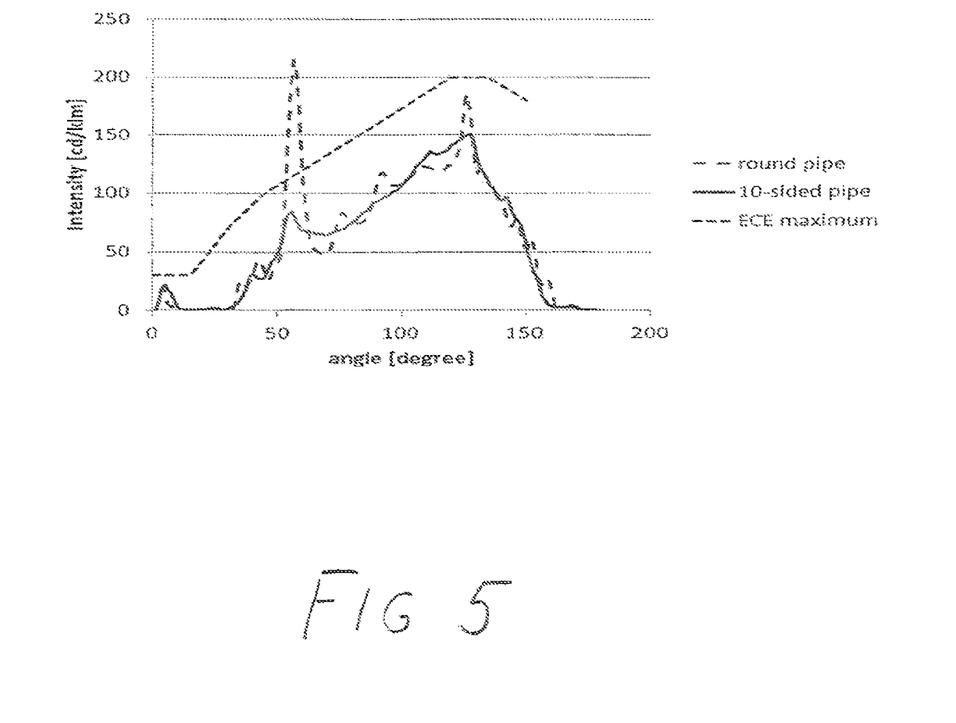
FIG. 5 illustrates an emission pattern of an LED lamp having the prior art light guide and one having a light guide according to the present disclosure.

FIG. 5 contains an emission pattern of the known FIG. 3 light guide arrangement whose peaks are present in above FIG. 6 as a cross-section through the peak, plotting intensity (candelas per kilo-lumens) vs. polar angle. The known FIG. 3 arrangement is presented as the curve in large dashes, it being noted that a peak at circa 55 degrees exceeds a limit imposed by the curve, shown in fine dashed line, of the ECE regulatory maximum.

Figure 1:
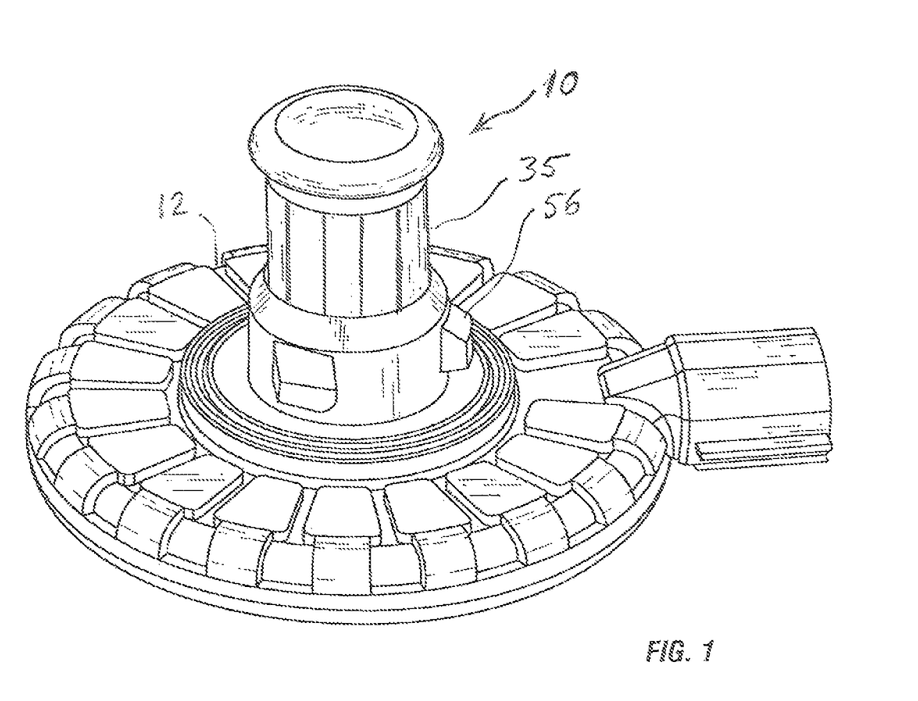
FIG. 1 is a perspective view of an embodiment of the present disclosure.
Figure 2:
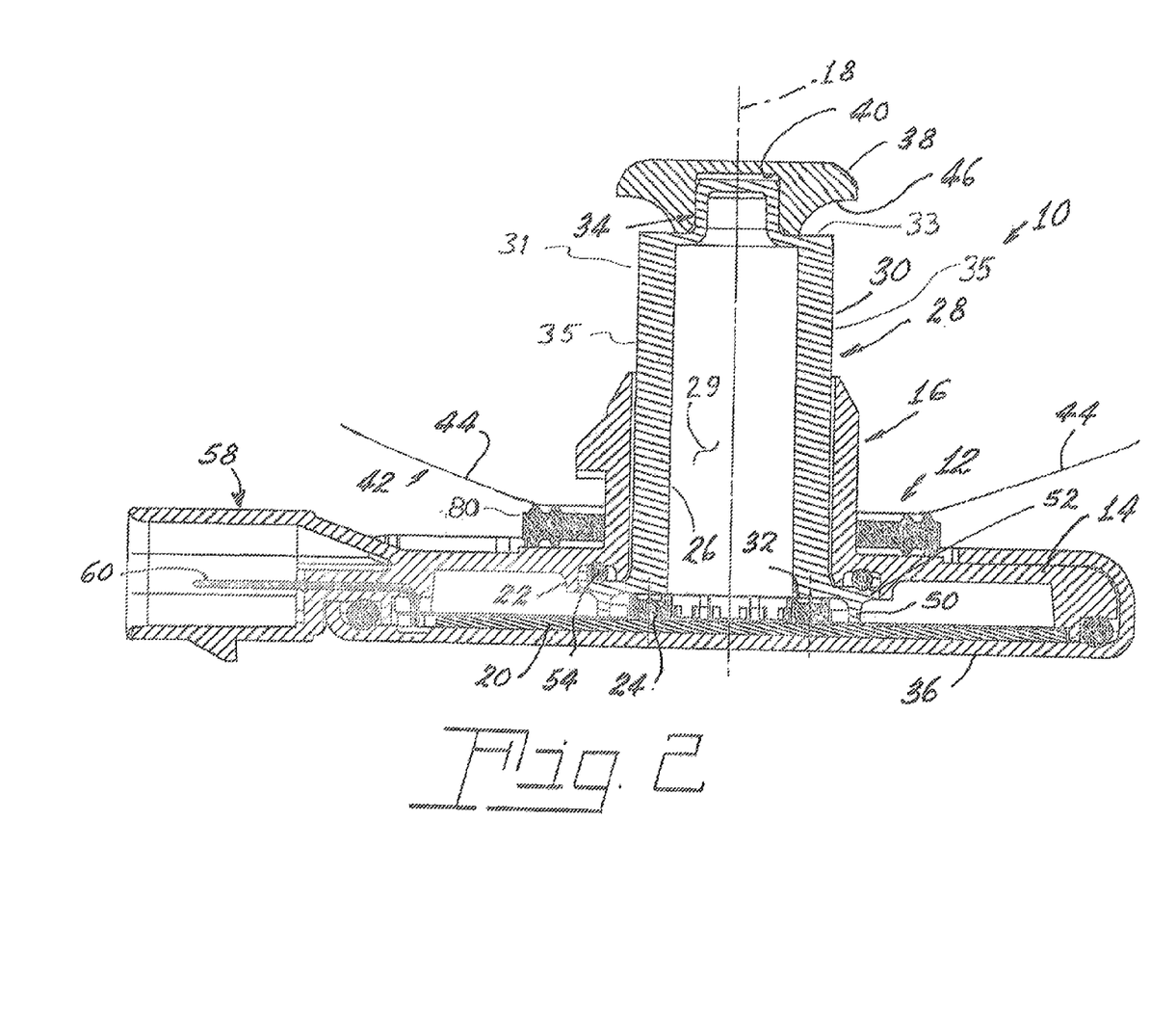
FIG. 2 is a sectional view taken along a longitudinal section of FIG. 1.

FIGS. 1 and 2 show an LED light source 10 of the present application comprising a housing 12 having a base 14. A hollow core 16 projects from the base 14 and is arrayed about a longitudinally extending optical axis 18. A printed circuit board 20 is positioned in the base 14 at one end 22 of the hollow core 16 and has a plurality of LEDs 24 operatively fixed thereto about the center thereof, in a preferred embodiment of the present disclosure the hollow core 16 is tubular and the array of LEDs is circular. A light guide 28 with a body 30 that is, in a preferred embodiment, cup-shaped (closed-end tubular) is shown in FIGS. 2 and 4A. A light guide is sometimes also referred to as a light pipe. The light guide 28 is positioned in the hollow core 16 and has at the light guide's first end a light entrance region 32 in operative relation with the plurality of LEDs 24 and a second end 34 projecting beyond hollow core 16. The radial wall thickness of light guide 28 is at least large enough to encompass the emitting area of the LEDs that are employed with it; in practice this wall thickness is about 3 mm. Preferably, light entrance region 32 is located close to and optically formed to capture a substantial portion, preferably all, of the emitted light from the LEDs 24 for conduction to the light guide 28. Further construction details are seen in U.S. Pat. No. 7,110,656, which is hereby incorporated by reference as if fully set forth herein.

In light guide 28, light guide body 30 extends between light entrance region 32 and light exit region 33. Light guide body 30 defines a hollow interior formed by a single, centrally located void or bore 29. Central bore 29 is aligned with optical axis 18. The plurality of wall segments 35 collectively define outer peripheral surface 31 of light guide body 30. As seen in a cross section perpendicular to optical axis 18, outer wall segments 35 define a closed polygon shape, preferably a regular polygon. In a regular polygon the wall segments are of equal length to one another, and the interior angle (sometimes also called "internal angle") defined between adjacent wall segments are equal. In any polygon having a number of sides a (where n is an integer), the sum of interior angles is (n−2)×180 degrees. In a regular polygon of a sides, each interior angle is (n−2)×180 degrees/n. Thus in light guide 28 having a 10-sided (also called decagon) regular polygon cross sectional shape shown in FIG. 1, 2, 4A, or 7, the interior angle is 144 degrees.

The wall segments 35 extend in planes that are parallel, or substantially parallel, to a plane containing optical axis 18. That is, for a polygon of an even number of sides, such as a 10-sided regular polygon (decagon) of light guide 28, the wall segments 35 that are diametrally opposite one another on opposite sides of optical axis 18 are parallel. That is, preferably wall segments 35, as seen in a longitudinal direction extending in a direction of optical axis 18, are not, in an optically relevant sense, mutually inclined to one another or tapered along their length, that is wall segments 35 maintain a substantially constant distance from optical axis 18. This is understood in an optically relevant sense, ignoring the small draft angle of typically less than 1 degree, or more commonly one-half to one-quarter degree, used as a convenience to remove molded plastic parts from their molds.

A heat sink 36 is positioned in a heat-transferring relationship with the printed circuit board 20 and a first reflector 38 is attached to the second end 34 of the light guide 28. A suitable heat sink is shown U.S. Pat. No. 7,059,748 and assigned to the assignee of the present disclosure, the teachings of which are hereby incorporated by reference.

The preferred light guide 28 has a projecting second end 34 formed with an outside diameter D1 that is less that the outside diameter D of the body 30 and the first reflector 38 is provided with a depression 40 that encompasses the diameter D1 so as to be mateable with the second end 34 of the light guide 28 in a press-fit In an alternate embodiment, not shown, of the present disclosure a light guide 28 is tubular and a first reflector 38 is formed with a protrusion that fits mateably within the open end of the light guide 28, details of which are more fully set forth in U.S. Pat. No. 7,110,656 at FIGS. 4b and 4c therein and are hereby incorporated by reference.

The light source 10 is formed to fit within an aperture in a second reflector 42 and the second reflector 42 has its reflective surface 44 facing a reflective surface 46 on the first reflector 38. Second reflector 42 is coupled to a chassis of a vehicle. A resilient elastomeric reflector gasket 80 is positioned about core 16 as an environmental seal.

The LEDs 24 preferably are arranged in an imaginary circle, preferably spaced equidistant on the imaginary circle, to disperse them one from the other and thereby facilitate cooling. Typically there are four LEDs 24 spaced equidistant in a circular pattern. At the same time the light guide 28 is formed as a tube, such as closed-end tube shown in FIG. 2, with optical axis 18. The light guide 28 has, formed at the first end of light guide 28, light entrance region 32 that bridges the LEDs 24 and thereby captures the light emitted directly and from the sides of the LEDs in one light guide.

Light guide 28 has a peripheral seat 50 formed adjacent light entrance region 32 to insure the proper spacing relationship to the LEDs 24. Additionally, the light guide's first end has a flange 52 formed thereabout that receives gasket 54 between the flange 52 and the one end 22 of the hollow core 16.

The outer surface of the hollow core 16 can be provided with fastening ears 56 for engaging the light source 10 within the second reflector 42, as is known. Also, a connector 58 can be provided on the body 16 containing electrical contacts 60 for providing the necessary power from an outside source to the printed circuit board 20 and thence to the LEDs 24.

As shown in the drawings, in operation, light from the LEDs 24 is fed through the common light guide 28 to the first reflector 38. The light is reflected from reflective surface 46 back to reflective surface 44 of the second reflector 42 and thence forward to the area external to the vehicle to be illuminated. The reflective surfaces 44 and 46 can be optically tuned to determine a preferred output beam pattern. Each can be an interchangeable part specific to a particular beam pattern, while the remaining lamp parts are standard components.

However, if desired the reflective cap 38 can be eliminated and the light can be emitted directly out of the light exit region 33 of light guide 28. The LED lamp 10 can then be employed with lenses or other structures to customize the light output.

The light guide 28 is made from a light-transmissive material such as molded acrylic materials such as Albis Opitx CA-41 or CA-75 or polymethylmethacrylate (PMMA). The material is chosen to be light transmissive in the light wavelength range of interest, as is known in the art. The utilization of the single light guide facilitates construction and the optical alignment, without the need to individually align and support multiple guides.

As a practical matter, to improve upon the performance of a known LED lamp model L1224R generally known in FIGS. 3 and 4B, and for purposes of compatibility with the size of lamp securement apertures in known tail lamp reflectors 44, it was chosen to design particular embodiments of the light guide 28 of the present invention based on the overall size of known light guide 82 in particular on its existing outside diameter of 16.5 mm. Applicants then selected an internal bore 29 defined by a cylindrical wall 26 since if internal bore 29 were to have corners, then light losses become very high, but that with a cylindrical inner bore and polygonal outer wall, light guide 28 still functions according to principles of total internal reflection (TIR). Having corners defined by the interior angle of adjacent wall segments 35 allows for more random light mixing, and shifts the light from the four LEDs 24 so that it does not overlap, Applicants thereby achieving the surprising result that the ECE R128 could be maintained without peaks in excess of the regulatory limits. Applicants performed simulations on polygonal shapes inscribed within the 16.5 mm O.D. circular cross section of known light guide 82 to model light guide 28. Applicants simulated body 30 having in cross section a regular polygon between five (5) sides up to twenty-three (23) sides, in increments of one (1) side, and determined through ray tracing that a range of from five (5) sides up to sixteen (16) sides avoided peaks in excess of the ECE regulation, and would thus be compliant.

A preferred embodiment of light guide 28 has ten (10) wall segments 35 defining body 30 that is a regular decagon in cross section. On an emission plot of the type shown in FIG. 6, the lamp 10 having light guide 28 of the present disclosure showed no peak in excess of the ECE R128 regulation, and as shown in FIG. 5 the emission pattern, shown in solid line, exhibits peaks below the ECE maximum.

Applicants determined through simulation that using an inscribed polygon of less than five sides led to inadequate size of light entrance region 32 to capture all light emitted from LEDs 24, so too much light would by-pass the light guide. Having a polygon shape defined by five or six sides would advantageously produce no peaks exceeding, the ECE regulation, but due to the sharpness of the internal angle (below 120 degrees) the pentagon or hexagon was less preferred due to light inefficiency. Having a greater number of sides reduces light losses and inefficiency, Applicants also determined that a regular polygon having up to sixteen (16) sides still remained within the ECE and sixteen was generally considered the most number of wall segments 35 since it then resulted in the minimum amount of tolerance or safety factor to stay within the ECE limit. Simulation on polygons of seventeen to twenty-three sides revealed peaks in excess of the ECE regulation. A ten-sided polygon (decagon) was seen as a good trade-off between light losses and inefficiency and comfortably staying below the ECE regulatory maximum given tolerances in manufacturing and alignment with LEDs 24.

It is pointed out that as shown in FIG. 5 the relevant measurement is the normalization of intensity (in candela) divided by total flux (in kilo-lumens), and this normalization creates a specification for the light distribution which is independent of the LED flux, thus a person of skill in the art in attempting to reduce peaks of the prior art (FIG. 3) lamp might consider simply reducing the LED current, but that would not eliminate the peaks that were in excess of ECE R128, since even if one halved the flux of the LED, then the total flux out of the lamp would be half and the intensity of the emitted light in any angle would be half as well, and therefore the ratio of intensity (cd)/bulb flux (klm) would remain the same. The present Applicants determined the surprising result that an advantageous range of regular polygon shapes for outer surface 31 of light guide 28 can satisfy the ECE regulation.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, are understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

An abstract is submitted herewith. It is pointed out that this abstract is being provided to comply with the rule requiring an abstract that will allow examiners and other searchers to quickly ascertain the general subject matter of the technical disclosure. It is submitted with the understanding that it will not be used to interpret or limit the scope or meaning of the claims, as set forth in the rules of the U.S. Patent and Trademark Office.

The following is a non-limiting list of reference numerals used in the specification:

10 LED lamp
12 housing
14 base
16 hollow core
18 optical axis
20 printed circuit board
22 an end of hollow core
24 LEDs
26 inner cylindrical wall
28 light guide
29 bore of light guide
30 body of light guide
31 outer peripheral surface of light guide
32 light entrance region
33 light exit region
34 second end
35 outer wall segments
36 heat sink
38 first reflector
40 depression
42 second reflector
44 reflective surface of second reflector
46 reflective surface of first reflector
50 peripheral seat
52 flange
54 gasket
56 fastening ear or bayonet lugs
58 connector
60 electrical contacts
62 backup light white LED assembly
64 electric wires to backup light
66 power supply to PCB 12
68 power plug
70 peak
72 secondary peak
80 reflector gasket
82 prior art light guide of U.S. Pat. No. 7,110,656

What is claimed is:

1. A vehicle light source, comprising:
a housing (12) having a base (14);
a printed circuit board (20) positioned in said base (14) and having a plurality of LEDs (24) operatively fixed thereto;
a light guide (28) having a light entrance region (32) proximal said plurality of LEDs (24) and a light exit region (33) distal from said light entrance region (32) and a light guide body (30) extending therebetween,
said light guide body (30) having a generally hollow interior defined by a single, centrally located bore (29) bounded by a cylindrical wall (26) arrayed around a central optical axis (18), said optical axis extending away from said plurality of LEDs (24);
said light guide body (30) further comprising, on an outer peripheral surface (31) thereof, a plurality of outer wall segments (35) bounding, as seen in cross-section transverse said optical axis (18), a regular polygonal shape having more than four sides, and wherein said light exit region (33) is axially opposite said light entrance region (32).

2. The vehicle light source of claim 1, wherein said outer wall segments (35) extend in planes substantially parallel said optical axis (18).

3. The vehicle light source of claim 1, wherein the plurality of outer wall segments (35) is between five and sixteen.

4. The vehicle light source of claim 1, wherein the plurality of LEDs (24) are spaced equidistant on an imaginary circle.

5. The vehicle light source of claim 1, wherein the plurality of outer wall segments (35) define a decagon.

6. The vehicle light source of claim 1, wherein adjacent outer wall segments (35) intersect at an internal angle of 144 degrees.

7. The vehicle light source of claim 1, wherein the plurality of outer wall segments (35) define a pentagon.

8. The vehicle light source of claim 1, wherein the plurality of outer wall segments (35) define a hexagon.

9. The vehicle light source of claim 1, wherein the plurality of outer wall segments (35) define a heptagon.

10. The vehicle light source of claim 1, wherein the plurality of outer wall segments (35) define a 9-sided polygon.

11. The vehicle light source of claim 1, wherein the plurality of outer wall segments (35) define an 11-sided polygon.

12. The vehicle light source of claim 1, wherein the plurality of outer wall segments (35) define a 16-sided polygon.

13. The vehicle light source of claim 1, further comprising a heat sink (36) in thermal communication with said printed circuit board (20).

14. The vehicle light source of claim 1, further comprising a reflector (46) attached to and optically coupled to said light exit region (33).

15. The vehicle light source of claim 1, wherein the plurality of outer wall segments (35) define an octagon.

16. The vehicle light source of claim 1, wherein the plurality of outer wall segments (35) define a 12-sided polygon.

17. The vehicle light source of claim 1, wherein the plurality of outer wall segments (35) define a 13-sided polygon.

18. The vehicle light source of claim 1, wherein the plurality of outer wall segments (35) define a 14-sided polygon.

19. The vehicle light source of claim 1, wherein the plurality of outer wall segments (35) define a 15-sided polygon.

20. The vehicle light source of claim 1, wherein the cylindrical wall (26) is continuously smoothly curved.

21. The vehicle light source of claim 14, wherein the reflector (46) is spaced from the light exit region (33).

22. A vehicle light source, comprising:
a housing (12) having a base (14);
a printed circuit board (20) positioned in said base (14) and having a plurality of LEDs (24) operatively fixed thereto;
a light guide (28) having a light entrance region (32) proximal said plurality of LEDs (24) and a light exit region (33) distal from said light entrance region (32) and a light guide body (30) extending therebetween,
said light guide body (30) having a generally hollow interior defined by a single, centrally located bore (29) bounded by a cylindrical wall (26) arrayed around a central optical axis (18), said optical axis extending away from said plurality of LEDs (24);
said light guide body (30) further comprising, on an outer peripheral surface (31) thereof, a plurality of outer wall segments (35) bounding, as seen in cross-section transverse said optical axis (18), a regular polygonal shape having more than four sides, wherein the cylindrical wall (26) is continuously smoothly curved extending over an entire axial length of said central bore (29) of said light guide body (30), said central bore (29) extending between said light entrance region (32) and said light exit region (33).

23. The vehicle light source of claim 22, wherein said plurality of LEDs (24) is in register with said light entrance region (32) and disposed, in a radial direction, between said inner cylindrical wall (26) and said outer peripheral surface (31).

24. A vehicle light source, comprising:

a housing (12) having a base (14);

a printed circuit board (20) positioned in said base (14) and having a plurality of LEDs (24) operatively fixed thereto;

a light guide (28) having a light entrance region (32) proximal said plurality of LEDs (24) and a light exit region (33) distal from said light entrance region (32) and a light guide body (30) extending therebetween, said light guide body (30) having a generally hollow interior defined by a single, centrally located bore (29) bounded by a cylindrical wall (26) arrayed around a central optical axis (18), said optical axis extending away from said plurality of LEDs (24);

said light guide body (30) further comprising, on an outer peripheral surface (31) thereof, a plurality of outer wall segments (35) bounding, as seen in cross-section transverse said optical axis (18), a regular polygonal shape having more than four sides, and wherein, in an energized condition of said plurality of LEDs (24), light exiting said light exit region (33) has, as viewed in a polar angular region declining 0 to 180 degrees relative said optical axis (18), an emission pattern whose normalized intensity does not exceed a regulatory maximum normalized intensity threshold proscribed by ECE Regulation 128.

25. The vehicle light source of claim 24, wherein the plurality of outer wall segments (35) is between five and sixteen.

26. A vehicle light source, comprising:

a housing (12) having a base (14);

a printed circuit board (20) positioned in said base (14) and having a plurality of LEDs (24) operatively fixed thereto;

a light guide (28) having a light entrance region (32) proximal said plurality of LEDs (24) and a light exit region (33) distal from said light entrance region (32) and a light guide body (30) extending therebetween, said light guide body (30) having a generally hollow interior defined by a single, centrally located bore (29) bounded by a cylindrical wall (26) arrayed around a central optical axis (18), said optical axis extending away from said plurality of LEDs (24);

said light guide body (30) further comprising, on an outer peripheral surface (31) thereof, a plurality of outer wall segments (35) bounding, as seen in cross-section transverse said optical axis (18), a regular polygonal shape having more than four sides, and further comprising a plurality of fastening projections (56) extending radially away from said optical axis (18) in spaced angular relation about said optical axis (18), said fastening projections (56) adapted to engage a socket of an automotive reflector.

27. The vehicle light source of claim 26, wherein the plurality of outer wall segments (35) is between five and sixteen.

\* \* \* \* \*